E. F. BERRY.
MOLD FOR APPLYING RUBBER SOLES TO BOOTS AND SHOES.
APPLICATION FILED JUNE 6, 1917.

1,256,649.

Patented Feb. 19, 1918.

Witness:
Jas. Es Hutchinson

Inventor:
Elmer F. Berry,
By Joseph H. Hunter, Attorney

UNITED STATES PATENT OFFICE.

ELMER F. BERRY, OF MARION, OHIO.

MOLD FOR APPLYING RUBBER SOLES TO BOOTS AND SHOES.

1,256,649.

Specification of Letters Patent.  Patented Feb. 19, 1918.

Application filed June 6, 1917.  Serial No. 173,111.

*To all whom it may concern:*

Be it known that I, ELMER F. BERRY, a citizen of the United States, residing at Marion, in the county of Marion and State of Ohio, have invented certain new and useful Improvements in Molds for Applying Rubber Soles to Boots and Shoes, of which the following is a specification, reference being had therein to the accompanying drawing.

The invention relates to improvements in a mold or adjustable form for applying, by vulcanization, rubber soles to boot and shoe uppers.

The object of the invention is to provide a mold having a base receiving the plastic sole composition with an upstanding wall, a portion of which is freely adjustable to vary the area of the mold cavity.

A further object of the invention is to provide a mold of this general character wherein the adjustable portion of the wall is resilient, presenting a continuous smooth molding surface and having means coöperating with a part carried by the base of the mold to maintain the same in its various positions.

More specifically, the invention embodies a mold of U-shaped formation, substantially one-half of the upstanding wall thereof being rigid with the base, and the other half consisting of a flat relatively wide resilient spring having a smooth inner surface and carrying on its outer surface independent supporting reinforcing and adjusting parts for the adjustable resilient member.

The practical embodiment of the invention is illustrated in the accompanying drawings forming a part of this specification, in which like reference characters indicate corresponding parts.

Figure 1:
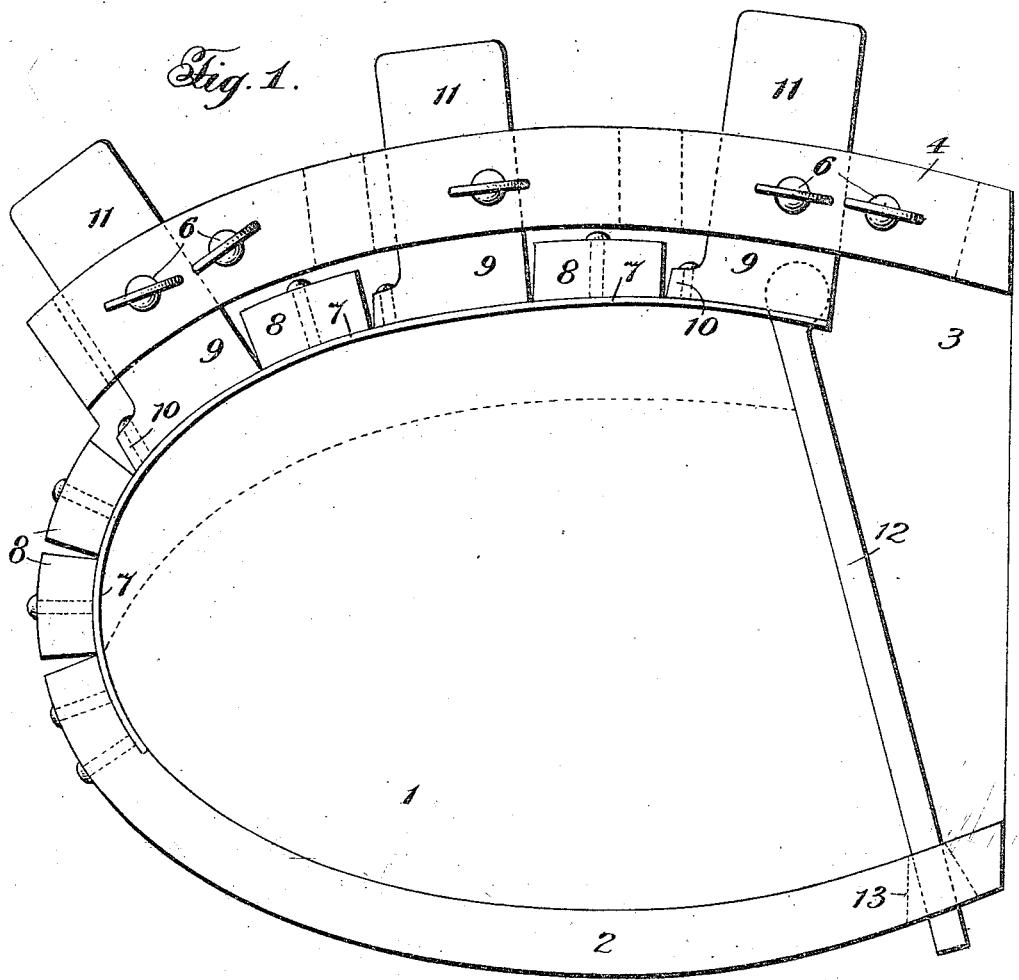
Figure 1 is a top plan view of my invention.
Figure 2:
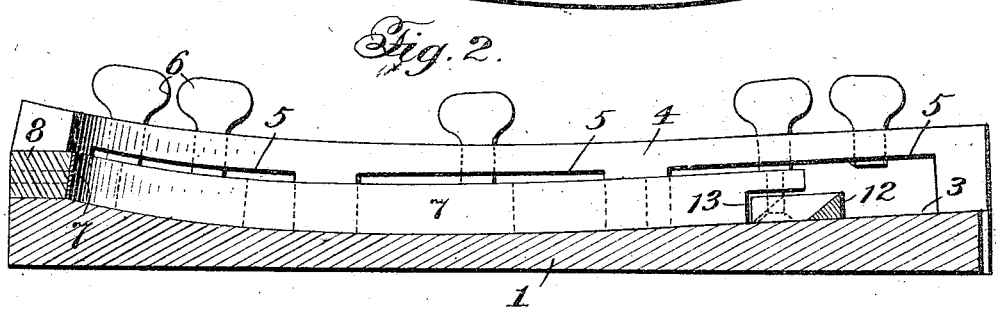
Fig. 2 is a longitudinal section of the same.

Referring now more particularly to the drawings, the reference character 1 indicates the base of the mold which is preferably concaved. The base is composed of metal and is of any desired size and thickness and is adapted to receive the rubber composition in a plastic state, forming the sole to be vulcanized to a rubber or leather boot or shoe. Preferably formed integral with the base plate 1, is an upstanding flange or wall portion 2 extending from one end substantially one-half the way around the edge of the base plate and of a substantial height. The base plate is not, strictly speaking, of a direct U-shaped formation but is provided on its side opposite the rigid wall 2, with an outstanding part 3 carrying an upwardly extending flange 4. The flange 4 is mounted entirely on the upstanding part 3 of the base plate and is provided within its borders with a series of slots 5, the walls of which receive the adjustable threaded pins 6, for a purpose which will presently appear. While in the embodiment of the invention disclosed, the flange 4 is shown as continuous and extending the entire length of the upstanding part 3, it will, of course, be understood that a series of separated flanges may be employed, without departing from the invention.

To render the mold cavity adjustable, so that various sized soles may be freely molded and vulcanized to the shoe uppers, a flat resilient spring is rigidly attached to the outer end of the wall 2 and constitutes with this portion of the wall, the side wall of the mold encircling the curved portion of the base of the same. The resilient member 7 has a smooth continuous inner surface, thereby preventing a gap or an abrupt part when the same is adjusted, such as is encountered where the adjustable section of the mold is composed of a multitude of separately adjustable parts for when these parts are adjusted, it is very hard to determine when they lie in actual alinement to produce a continuous and smooth mo'd surface. The spring 7 is preferably relatively thin, so that the desired degree of resiliency can be had and to support and reinforce the same, a series of independent separated blocks 8 are riveted thereto and extend radially from the spring. These blocks are relatively wide and are seated upon the base of the mold to adequately support the thin resilient spring, it being apparent that by separating the blocks a free adjustment of the spring from the dotted to the full line position is permissible. Interposed between the blocks are the adjusting devices 9 having nose portions 10 riveted to the spring, each device having an elongated shank 11 extending through the sockets 5 in the flange 4 to adjust the spring back and forth, thereby varying the area of the mold cavity. These devices are of a height substantially equal to the height of the resilient spring 7 and thereby not only perform the function of maintaining the spring in its adjusted position, but also afford a supporting and bearing means for the spring.

To close the end of the mold cavity, a bar 12 is employed, the same being pivoted to the inner adjusting device 9 and extending transversely across the base of the mold at an angle thereto and passing through a socket 13 in the rigid wall 2 of the mold, and it is obvious that this bar is adjustable in unison with the adjustment of the flat spring 7. forming a portion of the wall of the mold and closes and regulates the mold cavity for the reception of the molten rubber composition to be introduced thereto. The adjustable wall of the mold is maintained in its different adjusted positions through the coöperation of the adjusting devices 9 and the set screws 6 vertically disposed within the rigid flange 4 and contacting with the surfaces of the adjusting devices 9 upon the proper adjustment of these screws.

From the foregoing it will be seen that when the form is to be used the adjustable wall 7 is set to adapt the device for any sized sole, and maintained in its desired position by the set screws 6. After this initial adjustment plastic rubber composition is introduced into the mold cavity, and the leather or rubber boot or shoe is properly positioned over the mold and the base plate 1 subjected to the proper degree of heat, to thoroughly vulcanize the sole molded within the cavity to the boot or shoe. The vulcanization may, of course, be accomplished by any of the well known methods, but it has been found that by subjecting the metallic base 1 to the proper degree of heat, the same will conduct the heat and therefore, thoroughly vulcanize the molded sole to the positioned boot or shoe upper. It will also be apparent that the area of the mold cavity is varied by the adjustment of a single continuous spring 7, the devices 9 being moved back or forth, as the occasion may require, and this movement imparts a corresponding movement to the continuous spring 7 having the flat smooth molding surface, as well as the part 10 attached to one of the adjusting devices. When the proper adjustment has been secured, the movable mold parts are maintained in their adjusted positions by the tightening of the set screws 6, thus eliminating the independent adjustments of a multitude of sectors which do not move in unison and render it very difficult to position the various sectors in direct alinement when a sole is to be molded within the cavity.

In the accompanying drawings, I have shown the preferred embodiment of the invention, but it will, of course, be understood that many changes and variations in the arrangement of the parts can be made without departing from the spirit thereof.

Having thus described the invention, what I claim is:

1. In a mold of the character described, the combination with a base plate having a concaved surface, of a wall surrounding said plate, a portion of the wall being rigid and the remainder thereof being adjustable, the adjustable part of the wall comprising a resilient flat member attached to the rigid part, and a series of reinforcing devices carried by said resilient member.

2. In a mold of the character described, the combination with a base plate having a concaved surface, of a wall surrounding said plate, a portion of the wall being rigid and the remainder thereof being adjustable, the adjustable part of the wall comprising a resilient flat member attached to the rigid part, a series of reinforcing devices carried by said resilient member, and a transverse bar movable with the adjustable portion of the wall and closing one end of the mold.

3. A mold of the character described comprising a base, and a suitable wall disposed upon said base, a portion of the wall being adjustable, a flange carried by the base and extending parallel with said adjustable part, an arm attached to the adjustable part of the wall, and extending beyond said flange, and an adjustable member carried by said flange and coöperating with the arm for maintaining the adjustable portion of the wall in its different positions.

4. In a mold of the character described, the combination with a base having an upstanding wall, a portion of said wall being stationary and the remainder thereof adjustable, said adjustable part of the wall including a continuous member and a series of reinforcing elements carried by said member.

5. In a mold of the character described, the combination with a base having an upstanding wall, a portion of said wall being stationary and the remainder thereof adjustable, said adjustable part of the wall including a continuous member and a series of reinforcing elements carried by said member, said reinforcing elements comprising a plurality of separated relatively wide blocks adapted to rest upon the base of the mold.

6. A form of the character described comprising a base having an upstanding wall, a portion of the wall being adjustable and continuous, a flange carried by the base extending parallel with the adjustable portion of the wall, said flange being of a curvature corresponding with the curvature of the adjustable portion of the wall, and coöperating parts carried by the flange and the wall for maintaining said adjustable wall in its various adjusted positions.

In testimony whereof I affix my signature in presence of two witnesses.

ELMER F. BERRY.

Witnesses:
  W. E. HARKNESS,
  J. S. BONNER.

Copies of this patent may be obtained for five cents each, by addressing the "Commissioner of Patents, Washington, D. C."